United States Patent [19]

Tigges

[11] Patent Number: 5,253,688
[45] Date of Patent: Oct. 19, 1993

[54] TIRE PRESSURE CONTROL SYSTEM

[76] Inventor: Martin Tigges, Schlehenweg 30, D-4040 Neuss, Fed. Rep. of Germany

[21] Appl. No.: 758,614

[22] Filed: Sep. 12, 1991

[51] Int. Cl.$^5$ .................................................. B60C 23/00
[52] U.S. Cl. .................................... 152/417; 152/427; 301/128
[58] Field of Search .............. 152/415, 416, 417, 427; 301/128

[56] References Cited

U.S. PATENT DOCUMENTS

| | | | |
|---|---|---|---|
| 2,107,405 | 2/1938 | Williams | 152/417 |
| 2,218,143 | 10/1940 | Birchfield | 152/417 |
| 2,224,042 | 12/1940 | Embree et al. | 152/417 |
| 2,634,781 | 4/1953 | Turek | 152/417 |
| 2,634,782 | 4/1953 | Turek et al. | 152/417 |
| 4,498,515 | 2/1985 | Holtzhauser et al. | 152/427 |
| 4,892,128 | 1/1990 | Bartos | 152/417 |

*Primary Examiner*—Michael W. Ball
*Assistant Examiner*—Francis J. Lorin
*Attorney, Agent, or Firm*—Collard & Roe

[57] ABSTRACT

A tire pressure-controlling system is provided for vehicles in which the wheel is displaceable on the driven axle, in the axial direction, for adjusting different track widths, for example, for adapting the track width to agricultural requirements. The system includes a flexible conduit for providing pressurized air for the tire and a flexible conduit for providing a control air pressure to operate a valve located on the wheel to control pressurized air flow into the tire.

2 Claims, 8 Drawing Sheets

TIRE PRESSURE CONTROL SYSTEM

BACKGROUND OF THE INVENTION

1. Field of the Invention

The present invention relates to a tire pressure controlling system for vehicles, wherein the wheel is displaceable on the drive axle in the axial direction for adjusting different track widths, for example, for adapting the track width to agricultural requirements.

2. The Prior Art

It is known from World Publication No. 88/07940 that a tire pressure-controlling system for farm tractors has each of its wheels mounted on the wheel dish at the end of the rotating axle. The rotary passage, for feeding compressed air, is arranged between the stationary funnel or horn of the axle and the wheel axle supported therein. Such a rotary passage can be arranged in this way, only if the spacing between the wheel dish and the funnel or horn of the axle remains constant.

SUMMARY OF THE INVENTION

It is an object of the present invention to provide a tire pressure-controlling system for vehicles, wherein the wheel is displaceable on the drive axle, in the axial direction, for adjusting different track widths, for example, for adapting the track width to agricultural requirements.

Accordingly, the above object is achieved by providing a tire pressure control unit for motor vehicles, particularly for tractors, having a wheel with a tire comprising means for providing a pressure medium which is externally controlled, the pressure medium passing to the tire of the wheel, and the wheel having a bearing; a stationary axle on which the wheel is rotatably mounted; the pressure medium passing through an intermediary of a line, the intermediary line having a rotary transmission means, and the rotary transmission means being placed externally of the wheel bearing, and comprising at least two annular members coaxially disposed relative to the wheel axis, wherein one annular member is secured to the axle, and another tubular annular member is secured to the horn; a radially sealed first circumferential annular chamber formed between the two annular members, the lines for the pressure medium being fitted in the region of the annular chamber; and a second annular chamber which is sealed from the first annular chamber and serves to transmit the control medium of the control lines which are fitted in this region, the two annular chambers being provided in the spacing gap between cylindrical tubular portions, which are smooth on their outer and inner surfaces and form the annular members, said tubular portions being defined by contact seals and being outwardly sealed.

BRIEF DESCRIPTION OF THE DRAWINGS

Other objects and features of the present invention will become apparent from the following detailed description considered in connection with the accompanying drawings, which disclose one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 6:
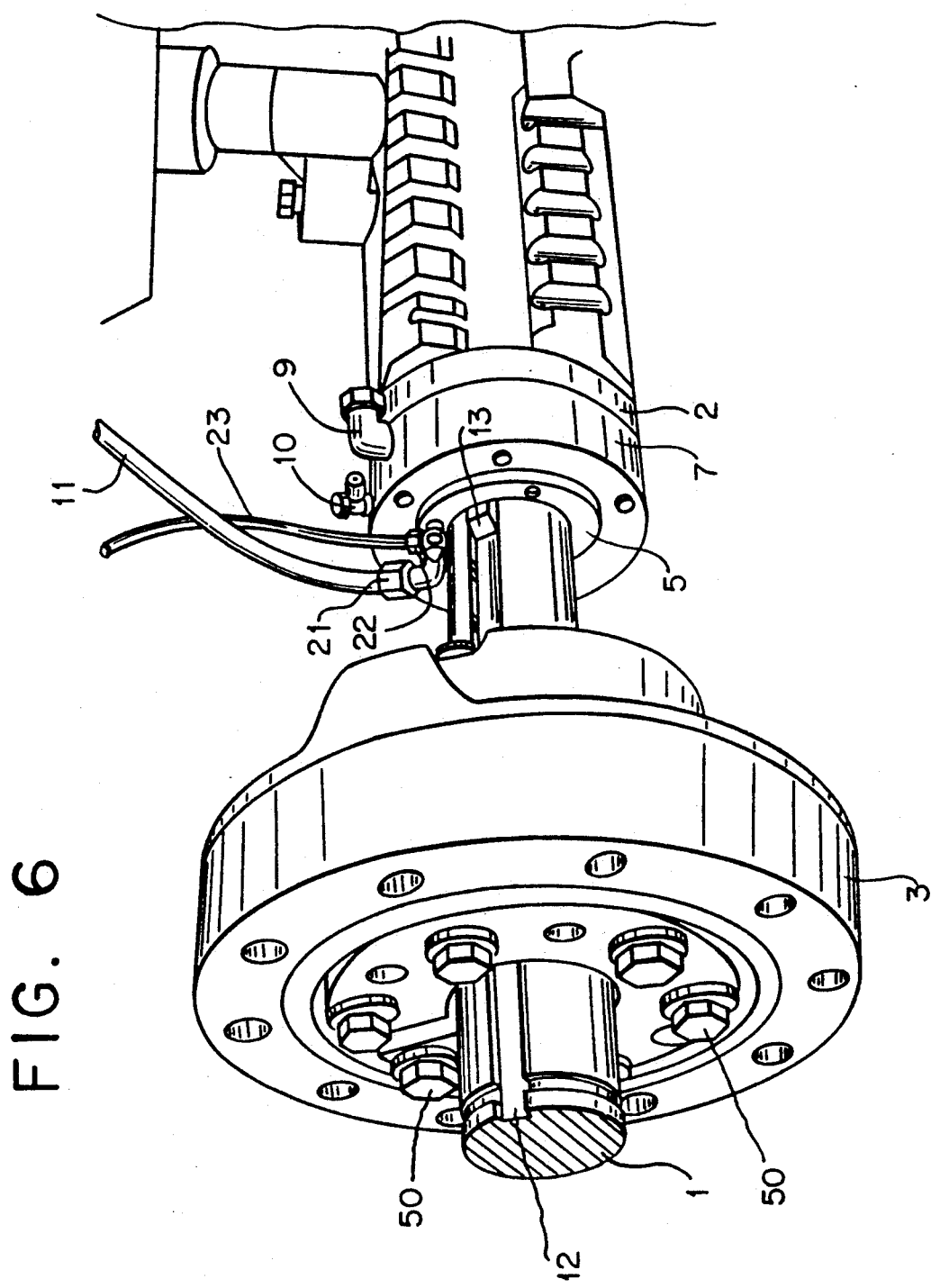
FIG. 6 shows the embodiment according to FIG. 5, with the wheel flange fixed on the driving shaft.
Figure 7:
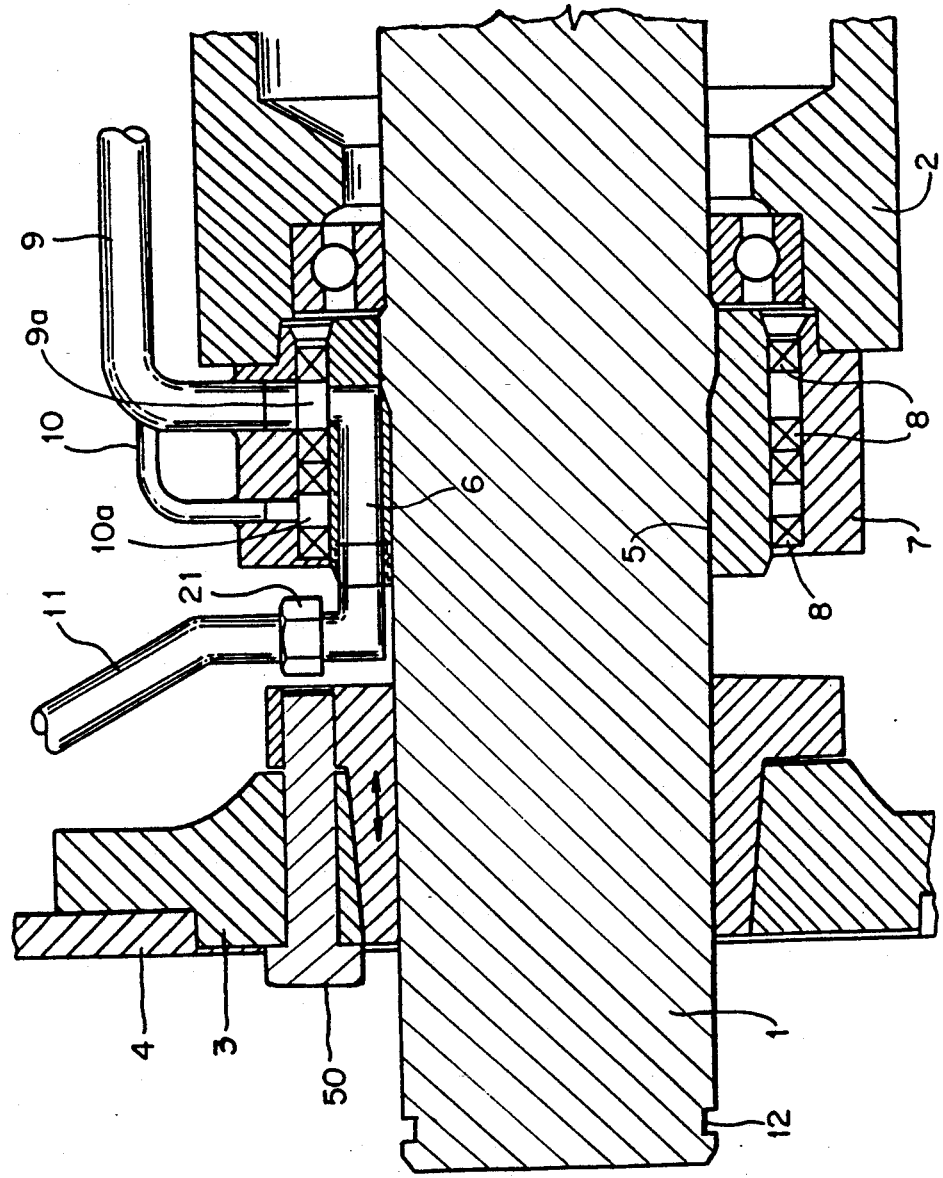
FIG. 7 shows a longitudinal section view of the embodiment of FIG. 6.

Turning now in detail to the drawings, which show, in FIG. 7, that the wheel flange, upon which the bowl of the rim is denoted by reference numeral 4, can be axially displaced and fixed on the drive wheel shaft or axle 1, and as seen in FIG. 6. The direction of displacement is indicated by the double arrow. The driving shaft 1 and bearings are accommodated in the stationary horn or body 2 of the axle.

The rotary passage for the compressed air is comprised of the two annular bodies 5 and 7, which are concentrically arranged, one on top of the other, forming an annular space between each other. This annular space is divided, in each case, into two connection chambers 9a and 10a by suitable seals 8. The inner annular body 5 of this arrangement is rigidly mounted on the driving shaft 1, while the outer annular body 7 is rigidly joined with the horn 2 of the axle. The first annular chamber is located radially inside the second annular chamber.

Figure 1:
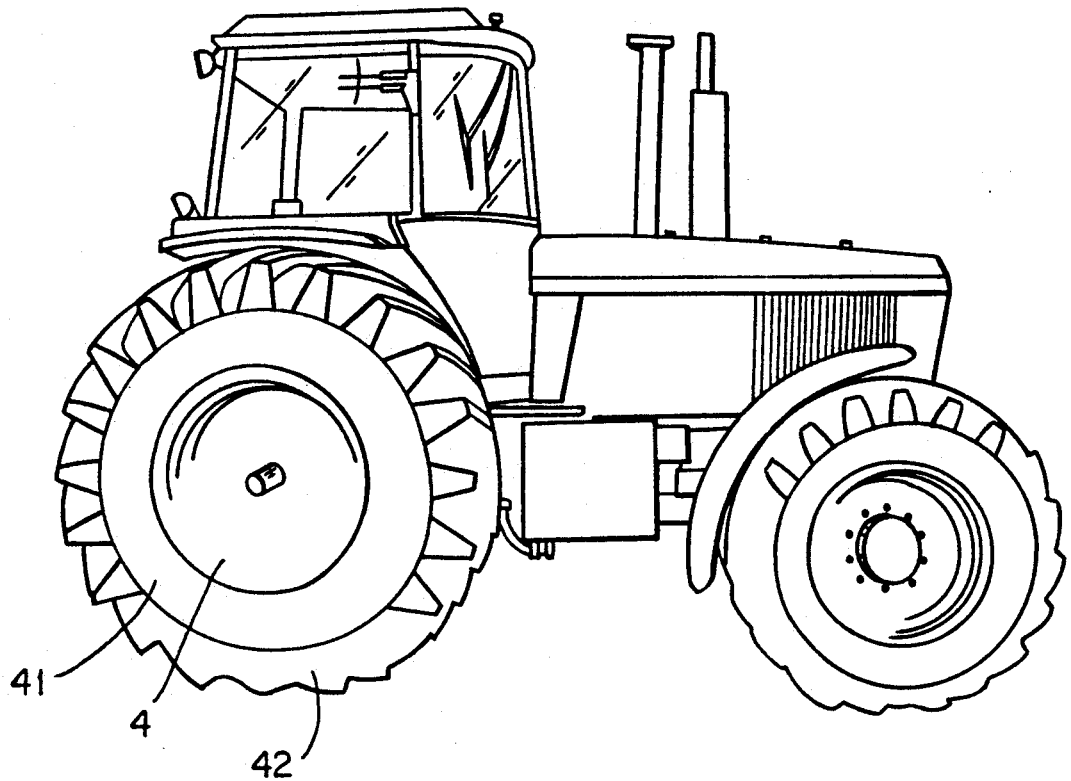
FIG. 1 shows a farm tractor with rear wheels displaceable on the drive shaft rear axle.
Figure 4:
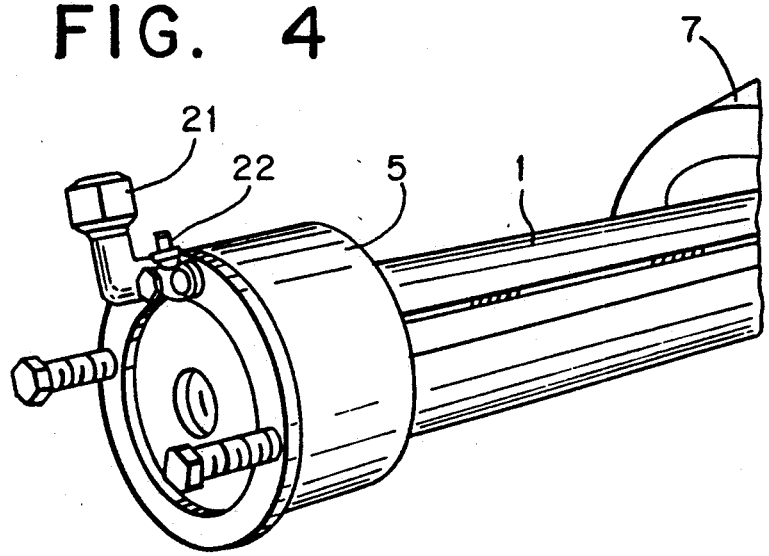
FIG. 4 shows the inner annular body mounted on the driving shaft on the face side, the connection for the conduit, and the connection for the control conduit leading to the wheel seen on the top face side of the annular body.
Figure 2:
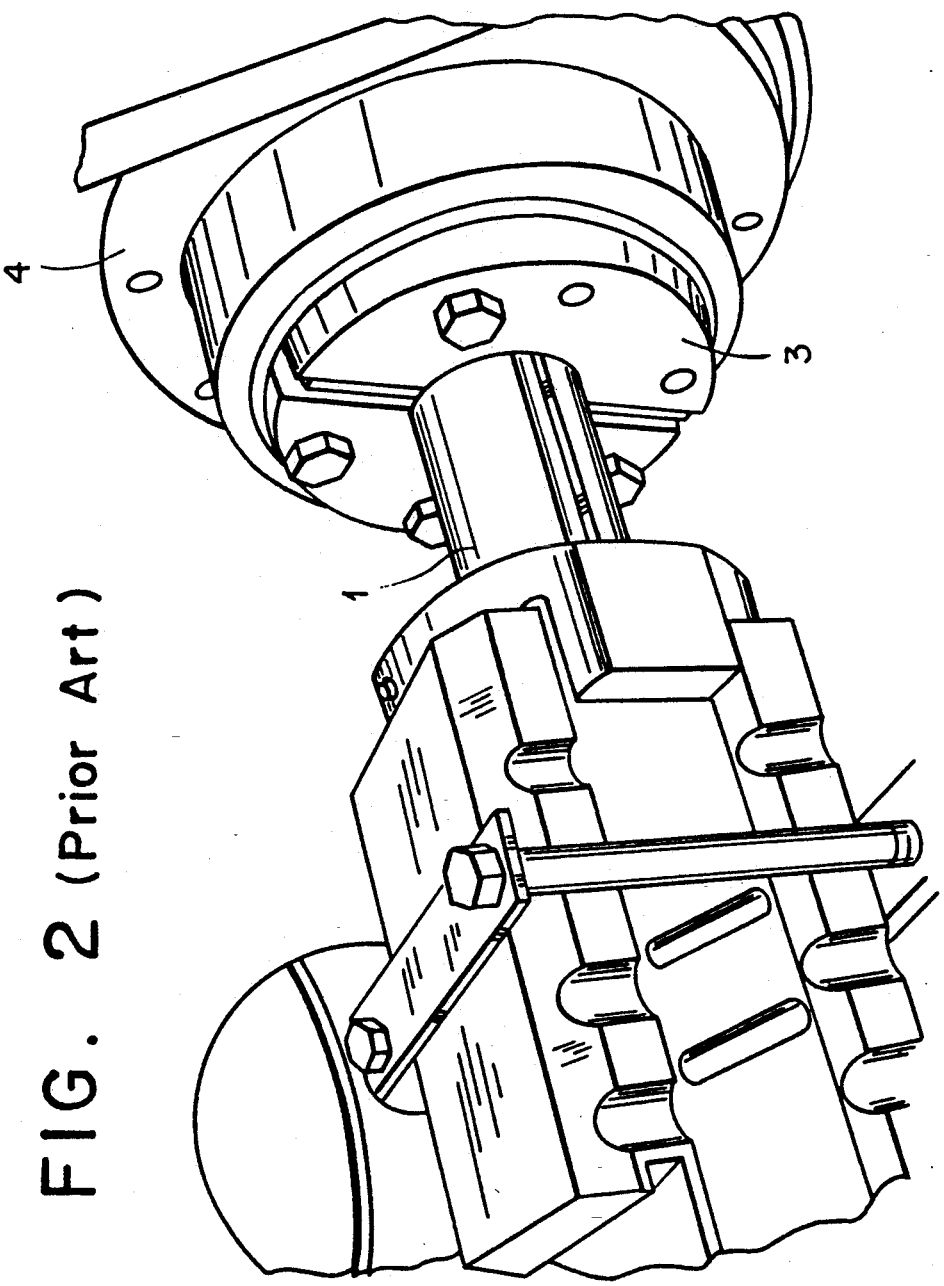
FIG. 2 shows an interior view of the wheel on the axle without the compressed air transmission passage parts.
Figure 3:
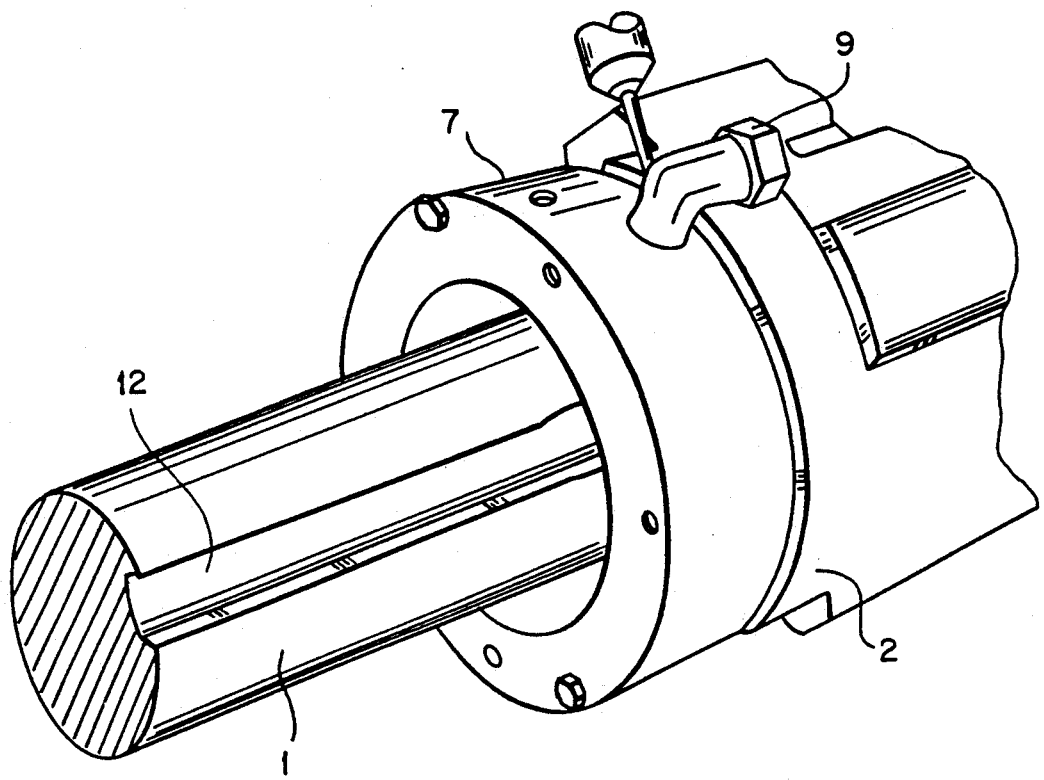
FIG. 3 shows the outer annular body fastened on the horn of the axle.

The outer annular body 7 is fastened to the horn 2 of the axle, as shown in FIG. 3. FIG. 4 shows the inner annular body 5 mounted on the end of the driving shaft 1; the connection 21 for the conduit 11 and the connection 22 for the control conduit 23 (see, FIG. 5) leading to the wheel 41 can be seen on the top face side of inner annular body 5.

Figure 5:
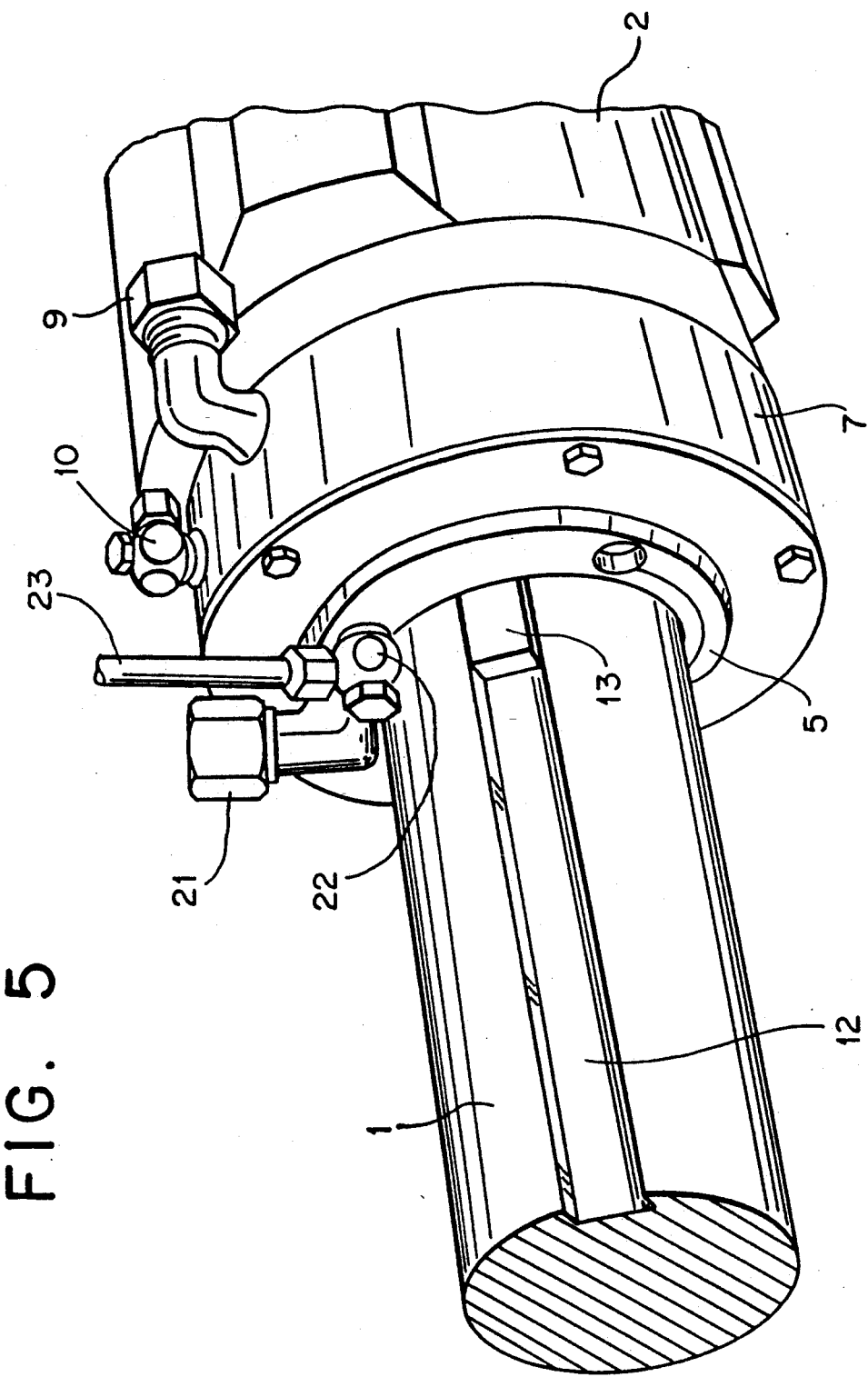
FIG. 5 shows how the horn of the axle, the outer annular body and the inner annular body are connected.

As seen in FIGS. 5, 6 and 7, the compressed air conduit 9 feeds into first chamber 9a. A duct 6 in the inner annular body 5 feeds into this chamber 9a from the inside, and connects with the jointly rotating conduit 11 leading from the inner annular body 5 to the wheel 41. This conduit 11 is formed according to the spacing to the wheel 41, i.e., its length is changed as required when the wheel flange 3 is displaced. Wheel flange 3 is displaced along axle 1 by loosening bolts 50, then displacing the flange either toward or away from horn 2, and then retightening bolts 50.

Figure 10:
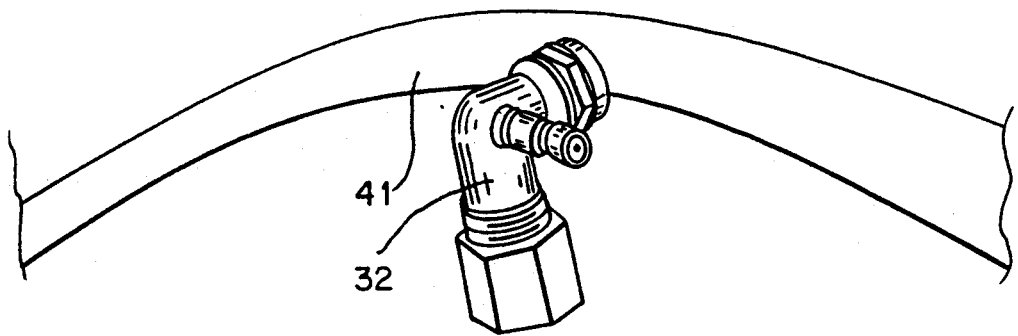
FIG. 10 shows the wheel valve individually.
Figure 8:
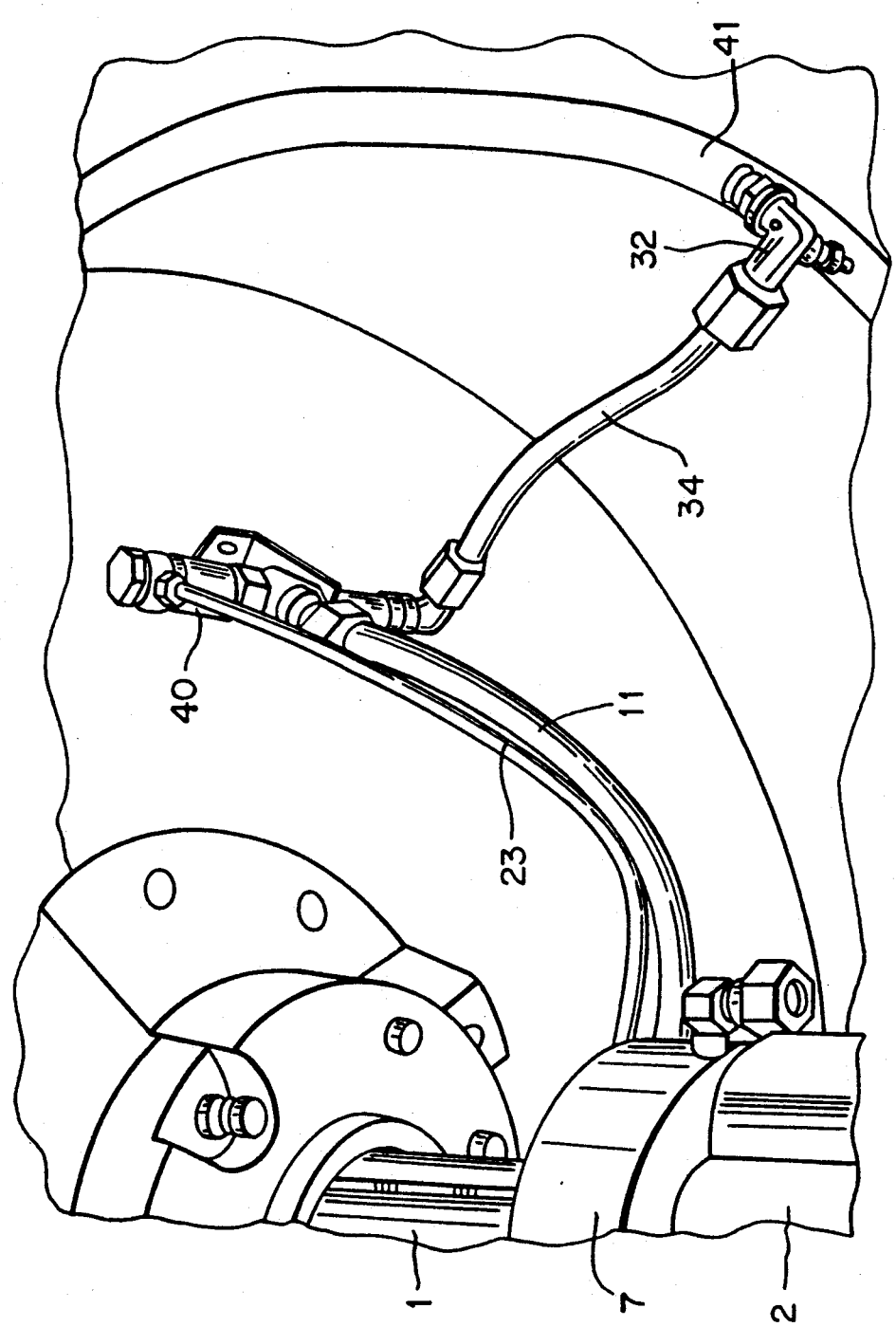
FIG. 8 shows the connection conduits from the inner annular body to the wheel.
Figure 9:
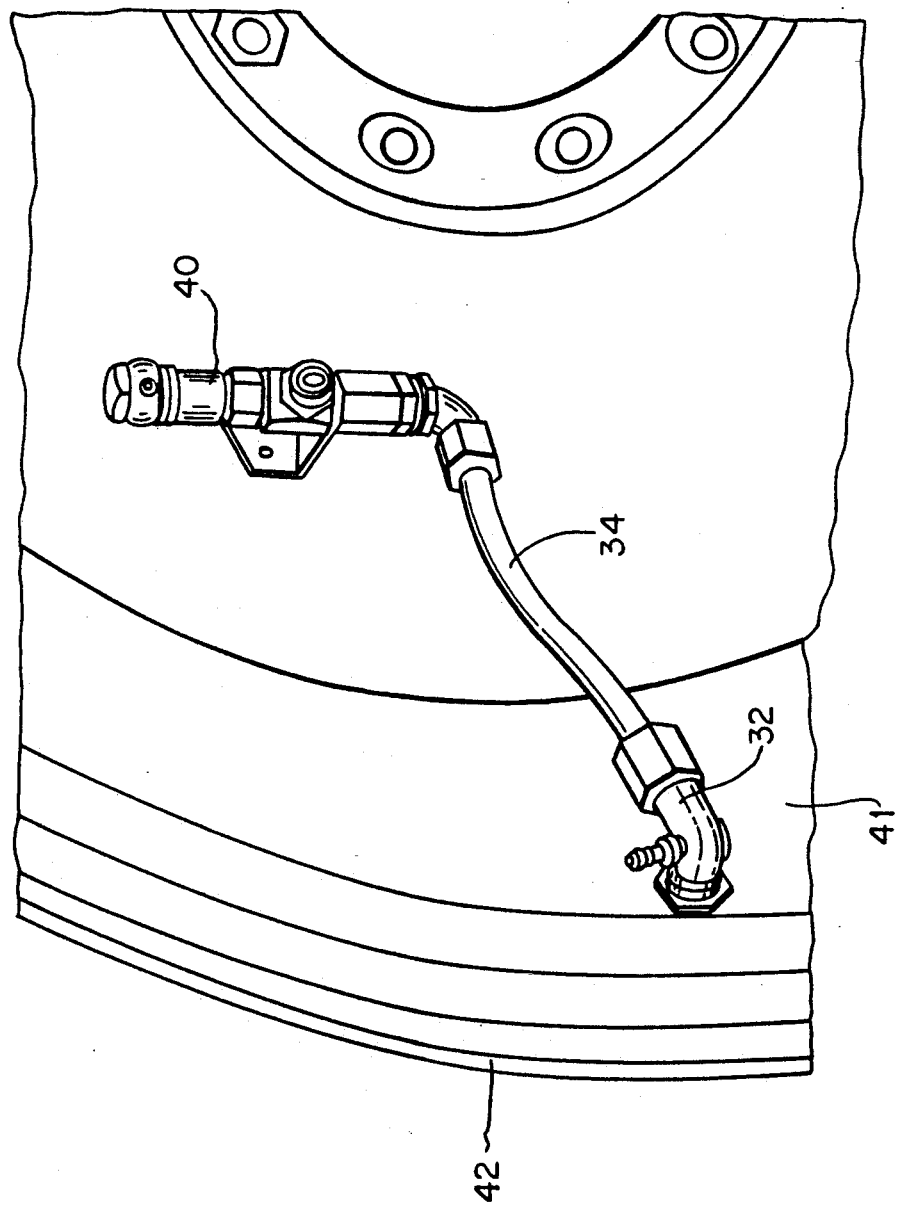
FIG. 9 shows the wheel connection, as shown in FIG. 8, with the wheel valve.

A conduit 10 feeds into the second chamber 10a. This chamber 10a is, in turn, connected with a duct (not shown in the drawings), which is arranged displaced by about 30 degrees parallel with the duct 6, feeding at its face side into a control conduit 23, shown in FIGS. 8 and 9, leading to a valve 40 as seen in FIGS. 8, 9 and 10. Both the conduit 11 and the control conduit 23 are connected to this valve 40. This valve 40 can be opened and closed via the control conduit 23. Compressed air is fed or discharged via the conduit 11 and the value 40 to the connection 32 on the wheel 41 through the flexible conduit 34.

The following are novel features and advantages of the invention vis-a-vis the state of the art:

The inner annular body 5 is rigidly mounted on the revolving driving shaft 1. The jointly rotating conduit 11 and the control conduit 23 lead from inner annular body 5 to the jointly rotating wheel 41, the latter being displaceable on the axle 1 in the axial direction. Air can flow through valve 32 into or out of tire 42.

For forming the two chambers 9a and 10a, the outer annular body 7 is rigidly mounted on the horn 2 of the axle, extending concentrically around the inner rotating annular body 5 with a spacing from the latter. The outer feed conduits 9 and 10 are inserted in said stationary outer annular body 7.

This construction permits maintaining the outer annular body 7 centered on or in the horn 2 of the axle. The inner annular body 5 is fixed and centered on the driving shaft 1. In the prior art, centering of the two annular bodies causes problems, as provision must be made for supporting elements for the two annular bodies.

The compressed air feed conduits 9 and 10 leading to the first and second chambers and also the conduit 11 and the control conduit 23 are flexible conduits. Conduit 34 is also a flexible conduit. As the wheel flange 3 is displaced toward horn 2, conduit 11 and control conduit 23, both being flexible, will bend to accommodate a reduced distance between flange 3 and horn 2. As the wheel flange 3 is displaced away from horn 2, conduit 11 and control conduit 23, both being flexible, will straighten out to accommodate an increased distance between flange 3 and horn 2. Axle 1 contains axial channel 12 along the length of axle 1 in which block 13 can be placed in order to maintain the inner annular body 5 mounted onto the drive shaft 1.

In comparison to the prior art, the connections on the two chambers 9a and 10a of the invention have been reversed, as seen in FIG. 7.

While only a single embodiment of the present invention has been shown and described, it is to be understood that many changes and modifications may be made thereunto, without departing from the spirit and scope of the invention as defined by the appended claims.

What is claimed is:

1. Tire pressure control unit for motor vehicles, particularly for tractors, in combination with a wheel with a tire, wherein the wheel is displaceable on a drive axle in an axial direction for adjusting to different track widths, comprising:
   a revolving drive axle on which said wheel is rotatably mounted;
   displacement means for having the wheel be displaceable on said drive axle in an axial direction;
   means for providing a pressure medium;
   flexible means for passing said pressure medium to the tire of the wheel, and said wheel having an axis;
   flexible control means for controlling said means for passing said pressure medium to the wheel;
   a stationary horn in which said axle is accommodated;
   said pressure medium passing through an intermediary line, said intermediary line passing through a rotary air transmission means, and said rotary transmission means being placed externally of the wheel, and comprising an inner annular member coaxially disposed within an outer annular member, said annular members coaxially disposed relative to the wheel axis, wherein said inner annular member is secured to the axle, and said outer annular member is secured to the horn;
   a radially sealed first circumferential annular chamber formed between the inner and outer annular members, said means for providing the pressure medium being fitted in said first annular chamber; and
   a second circumferential annular chamber which is axially sealed from the first annular chamber and serves to transmit a control medium through a control line which is fitted in said second annular chamber, the first and second annular chambers being provided in said inner annular member;
   said flexible means for passing said pressure medium connecting said first annular chamber to said wheel;
   said flexible control means connecting said second annular chamber to the wheel;
   wherein said flexible means for passing said pressure medium to the wheel comprises a flexible conduit connected to a valve on the wheel;
   wherein said flexible control means for controlling said means for passing said pressure medium comprises a flexible control conduit which transmits said control medium to said valve on the wheel either to open the valve thereby permitting the pressure medium to flow controllably into the tire or to close the valve thereby shutting off the flow of the pressure medium into the tire;
   a connection on the tire through which the pressure medium is fed into the tire or discharged from the tire; and
   a flexible conduit connecting said valve on the wheel to said connection on the tire; and
   whereby the wheel is displaceable on the drive axle in an axial direction for adjusting to different track widths with the tire pressure control unit connected thereto.

2. The tire pressure control unit according to claim 1, wherein said second annular chamber is located within said inner annular member;
   wherein said first annular chamber is located within said inner annular member between said second annular chamber and axle; and
   wherein said annular chambers are provided at different radial spacings in a plurality of coaxial, spaced-apart portions of said inner annular member and revolve along with the drive axle and the rotatably mounted wheel.

* * * * *